No. 703,595. Patented July 1, 1902.
W. KENNEALLY.
PIPE JOINT.
(Application filed Feb. 18, 1902.)
(No Model.)
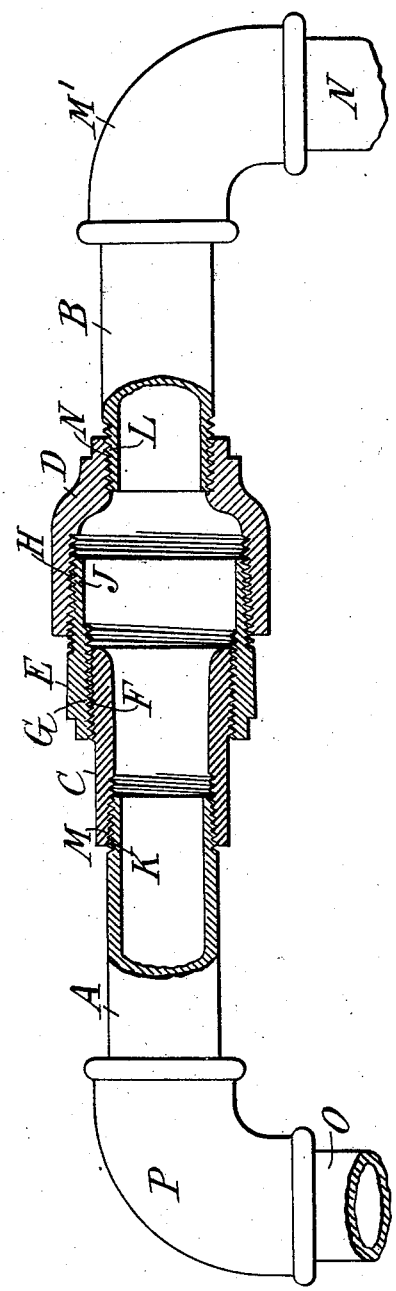
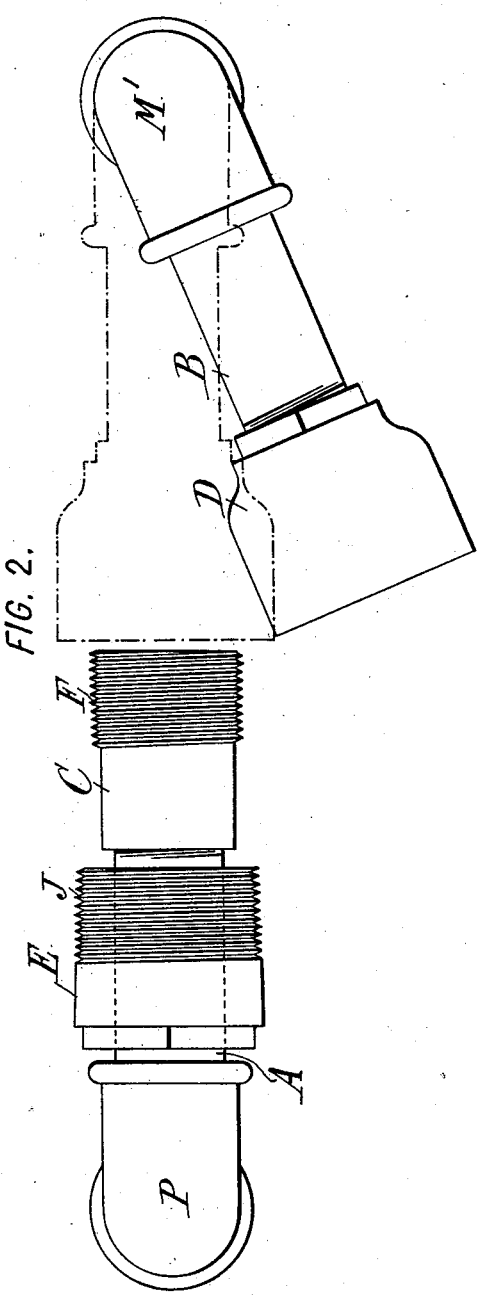
WITNESSES:
René Bruine
Fred White
INVENTOR
William Kenneally,
By Attorneys,

UNITED STATES PATENT OFFICE.

WILLIAM KENNEALLY, OF NEW YORK, N. Y.

PIPE-JOINT.

SPECIFICATION forming part of Letters Patent No. 703,595, dated July 1, 1902.

Application filed February 13, 1902. Serial No. 93,976. (No model.)

*To all whom it may concern:*

Be it known that I, WILLIAM KENNEALLY, a citizen of the United States, residing in the borough of Manhattan, city, county, and State of New York, have invented certain new and useful Improvements in Pipe-Joints, of which the following is a specification.

My invention aims to provide an improved joint or coupling for connecting two ends of pipe which are substantially fixed in position, the principal object of the invention being to secure a perfectly tight joint without the necessity of moving either of the pipes or of putting any longitudinal strain thereon.

My invention aims also to provide certain improvements in detail hereinafter referred to.

The accompanying drawings illustrate an embodiment of my invention.

Figure 1 is a longitudinal section showing two ends of pipe joined by my improved device. Fig. 2 is a plan of Fig. 1 with the ends of the pipe disconnected.

My improved joint includes a pair of tailpieces, which are adapted for attachment to the two fixed ends of pipe to be connected, and a follower, which is adapted for attachment at its respective ends to said tailpieces. The movement of the follower on the tailpieces is limited, so as to substantially avoid longitudinal movement of the pipes or longitudinal strain thereon. The joint is preferably also made tight without the use of packing by means of tapering screw-threads, so that at the desired limit of movement the joint is tight.

Referring now to the drawings, A B indicate two intermediate ends of a system of piping which it is desired to connect and which in being connected should not or cannot be spread apart or pulled toward each other.

C and D are tailpieces which screw onto the ends A and B of pipe.

E is the follower, which by turning in a given direction screws outward toward the free end of the tailpiece C and inward toward the pipe end of the tailpiece D, and which is of greater internal diameter than the external diameter of the body of the tailpiece C, so as to slide over the same. It is understood that any or all of the screw-threaded connections shown may be reversed in position from the inside to the outside of the member, or vice versa. The screw-thread F on the free end of the tailpiece C is tapered toward the pipe end of the tailpiece, and the thread G of the follower E is tapered in a corresponding direction, so that as the follower is screwed outward on the tailpiece it is tightened and stopped at a certain predetermined position. The thread H on the tailpiece D is likewise tapered toward its pipe end and the thread J of the follower tapered in the corresponding direction, so that the movement of the follower relatively to the tailpiece D is also limited and the joint becomes tight at a determined position of the parts. When the follower is in the stated position, there is not only no further relative movement of the parts, but the joint is practically leak-tight if the ordinary red lead is used on the threads.

It will be observed that with the follower and tailpieces in the packed position referred to the total length of the coupling from the pipe end of the tailpiece C to the pipe end of the tailpiece D is fixed. In applying my improved joint this distance is marked off on the pipe ends to be joined, and screw-threads K and L are cut on the respective pieces to such a distance only as will permit the tailpieces to be screwed thereon until the pipe ends of such tailpieces coincide with the lines marked to indicate the total length of the joint. Preferably the screw-threads K and L and the corresponding screw-threads M and N on the tailpieces are tapered, so as to limit the movement of the tailpieces on the pipes and to pack them tightly when they have reached the limit of their movement.

I preferably form the tailpieces C and D of such diameter that the former can enter the latter, and in order to make the follower as simple as possible I preferably form the tailpiece C as a male member, upon the outside of which the follower E screws, and the tailpiece D as a female member, upon the inside of which the follower screws. The proportions stated have the advantage that the joint may be attached without moving the pipes A or B in any direction, the tailpiece C, as will be observed, entering the tailpiece D as it is screwed off the pipe A. The tailpiece D may likewise be screwed off the pipe B without interference. Regardless of the relative diameters of the parts, they may be attached to the several pipe ends by turning one or both of them slightly, as indicated in full lines in Fig. 2, when this is possible. It is understood that the parts illustrated may be set in place without moving the pipes from the position shown in dotted lines in Fig. 2. The follower E is first slid back along the pipe A, after which the tailpiece C is attached.

It will be seen that my invention provides an improvement which is of great value in avoiding the usual expensive ground joints and the usual washers and loose follower, which are not permanently tight, as is my improved joint.

My joint is very cheaply made, and yet more efficient than joints of the type now in use. Either of the tailpieces C or D might of course be made in some other shape than that of a straight fitting screwing directly on a pipe in line with the pipe A. For example, the tailpiece D might be made integral with the pipe B and elbow M', so that it could be screwed directly to the vertical pipe N, the distance between the vertical pipes N and O being made up by suitably proportioning the pipe A, or the male tailpiece C might be made integral with the section of pipe A and the elbow P, the required distance being made up by suitably proportioning the length of the pipe B.

A feature which contributes considerably to facility in connecting up the parts is the arrangement of the threads G and J on the follower, so that one of such threads will engage its corresponding thread on the tailpiece before the other does. For example, the thread G engages the thread F, and the follower makes two revolutions in such engagement before the thread J comes into engagement with the thread H. The drawings indicate this by showing two more threads engaged with the tailpiece C than with the tailpiece D. By this means there is no difficulty in bringing the two sets of threads into proper engagement. The first engagement is very easily effected, and the turning of the follower upon the first set of threads forces it into engagement at the second set of threads at the same time that it forces it forward.

Though I have described with great particularity of detail a pipe-joint embodying my invention, it is to be understood that the invention is not limited to the particular structure described, but is capable of wide variation by those skilled in the art without departing from the invention.

What I claim is—

1. A pipe-joint comprising in combination a pair of tailpieces adapted for attachment to the ends of pipes, and one of said tailpieces adapted to enter the other, and a follower adapted for attachment to said tailpieces and limited in its movement on each of said tailpieces so as to substantially avoid longitudinal movement of said pipes, and said follower being of a diameter sufficient to slide over the body of one of said tailpieces.

2. A pipe-joint comprising in combination a pair of tailpieces adapted for attachment to the ends of pipes, and one of said tailpieces adapted to enter the other, and a follower, said follower and tailpieces being provided with tapered screw-threads whereby said follower is adapted for screwing on said tailpieces, but is limited in its movement toward the free end of one and the pipe end of the other of said tailpieces to substantially avoid longitudinal movement of said pipes, and said follower being of a diameter sufficient to slide over the body of one of said tailpieces.

3. A pipe-joint comprising in combination a pair of tailpieces adapted for attachment to the ends of pipes and limited in their movement thereon, and one of said tailpieces adapted to enter the other, and a follower adapted for attachment to said tailpieces and limited in its movement on each of said tailpieces so as to substantially avoid longitudinal movement of said pipes, and said follower being of a diameter sufficient to slide over the body of one of said tailpieces.

4. A pipe-joint comprising in combination a pair of tailpieces adapted for attachment to the ends of pipes and limited in their movement thereon, and one of said tailpieces adapted to enter the other, and a follower, said follower and tailpieces being provided with tapered screw-threads whereby said follower is adapted for screwing on said tailpieces but is limited in its movement toward the free end of one and the pipe end of the other of said tailpieces to substantially avoid longitudinal movement of said pipes, and said follower being of a diameter sufficient to slide over the body of one of said tailpieces.

5. A pipe-joint comprising in combination a pair of tailpieces adapted for attachment to the ends of pipes and having tapered screw-threads whereby to limit their movement thereon, and one of said tailpieces adapted to enter the other, and a follower, said follower and tailpieces being provided with tapered screw-threads whereby said follower is adapted for screwing on said tailpieces, but is limited in its movement toward the free end of one and the pipe end of the other of said tailpieces to substantially avoid longitudinal movement of said pipes, and said follower being of a diameter sufficient to slide over the body of one of said tailpieces.

6. A pipe-joint comprising in combination male and female tailpieces C and D adapted for attachment to the ends of pipes, and the free end of the tailpiece C adapted to enter the free end of the tailpiece D, and a follower E adapted for attachment to said tailpieces and limited in its movement on each of said tailpieces so as to substantially avoid longitudinal movement of said pipes, and said follower E being of a diameter sufficient to slide over the body of said tailpiece C.

7. A pipe-joint comprising in combination a pair of tailpieces adapted for attachment to the ends of pipes and one of said tailpieces adapted to enter the other, and a follower, said follower and tailpieces being provided with tapered screw-threads whereby said follower is adapted for screwing on said tailpieces, but is limited in its movement toward the free end of one and the pipe end of the other of said tailpieces to substantially avoid longitudinal movement of said pipes, the screw-threads of said follower coming into engagement with the screw-threads on one of said tailpieces before they come into engagement with the threads on the other of said tailpieces.

In witness whereof I have hereunto signed my name in the presence of two subscribing witnesses.

WILLIAM KENNEALLY.

Witnesses:
DOMINGO A. USINA,
FRED WHITE.